(12) United States Patent
Chaudhry

(10) Patent No.: US 8,341,675 B2
(45) Date of Patent: Dec. 25, 2012

(54) METHOD AND SYSTEM FOR PROVIDING PROGRAM GUIDE DATA FROM A CONTENT PROVIDER TO A USER DEVICE THROUGH A PARTNER SERVICE PROVIDER BASED UPON USER ATTRIBUTES

(75) Inventor: Kapil Chaudhry, Cerritos, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 827 days.

(21) Appl. No.: 11/960,574

(22) Filed: Dec. 19, 2007

(65) Prior Publication Data

US 2009/0165055 A1 Jun. 25, 2009

(51) Int. Cl.
G06F 3/00 (2006.01)
G06F 13/00 (2006.01)
H04N 5/445 (2011.01)

(52) U.S. Cl. ............................... 725/48; 725/39
(58) Field of Classification Search .................. 725/48
See application file for complete search history.

(56) References Cited

U.S. PATENT DOCUMENTS

| | | | |
|---|---|---|---|
| 5,666,645 A | 9/1997 | Thomas et al. | |
| 6,201,536 B1 | 3/2001 | Hendricks et al. | |
| 6,216,265 B1 | 4/2001 | Roop et al. | |
| 6,268,849 B1 | 7/2001 | Boyer et al. | |
| 6,314,571 B1 | 11/2001 | Ogawa et al. | |
| 6,374,402 B1* | 4/2002 | Schmeidler et al. | 717/167 |
| 6,925,650 B1 | 8/2005 | Arsenault et al. | |
| 6,934,964 B1* | 8/2005 | Schaffer et al. | 725/46 |
| 7,404,201 B2 | 7/2008 | Takeuchi et al. | |
| 7,571,454 B2 | 8/2009 | Potrebic et al. | |
| 7,640,579 B2 | 12/2009 | Shewchuk et al. | |
| 2002/0046407 A1* | 4/2002 | Franco | 725/110 |
| 2002/0184653 A1 | 12/2002 | Pierce et al. | |
| 2003/0028892 A1* | 2/2003 | Gewickey et al. | 725/110 |
| 2003/0095791 A1* | 5/2003 | Barton et al. | 386/83 |
| 2003/0236835 A1 | 12/2003 | Levi et al. | |
| 2004/0028386 A1 | 2/2004 | Walls et al. | |
| 2004/0068742 A1 | 4/2004 | Cushing et al. | |
| 2005/0022237 A1 | 1/2005 | Nomura | |
| 2005/0028208 A1 | 2/2005 | Ellis et al. | |
| 2005/0044377 A1 | 2/2005 | Huang | |
| 2005/0086683 A1* | 4/2005 | Meyerson | 725/30 |
| 2005/0138654 A1* | 6/2005 | Minne | 725/31 |
| 2005/0192987 A1* | 9/2005 | Marsh | 707/100 |
| 2005/0235047 A1* | 10/2005 | Li et al. | 709/219 |
| 2005/0251825 A1* | 11/2005 | Fukuda et al. | 725/44 |

(Continued)

OTHER PUBLICATIONS

Non-final Office action dated May 23, 2011 in U.S. Appl. No. 11/960,560, filed Dec. 19, 2007 by Kapil Chaudhry.

(Continued)

*Primary Examiner* — Brian Pendleton
*Assistant Examiner* — Jonathan V Lewis

(57) ABSTRACT

A method and system for providing program guide data to a user network device associated with a user identifier includes a partner service provider in communication with the user network device and a primary service provider in communication with the partner service provider authenticating the user network device provider using the user identifier. The user network device generates a request for program guide data and communicates the user identifier and the request to the partner service provider. The partner service provider or the primary service provider communicates program guide data to the user network device based on the identifier data. The user network device displays the program guide data on a display device.

45 Claims, 9 Drawing Sheets

U.S. PATENT DOCUMENTS

| | | | |
|---|---|---|---|
| 2006/0037060 A1* | 2/2006 | Simms et al. | 725/119 |
| 2006/0107304 A1* | 5/2006 | Cleron et al. | 725/135 |
| 2006/0117342 A1* | 6/2006 | Park et al. | 725/37 |
| 2006/0271996 A1* | 11/2006 | Sato | 725/135 |
| 2007/0169144 A1 | 7/2007 | Chen et al. | |
| 2007/0283404 A1* | 12/2007 | Xu et al. | 725/118 |
| 2007/0288967 A1 | 12/2007 | Candelore et al. | |
| 2008/0098450 A1* | 4/2008 | Wu et al. | 725/132 |
| 2008/0134277 A1* | 6/2008 | Tucker | 725/133 |
| 2008/0148351 A1 | 6/2008 | Bhatia et al. | |
| 2008/0235513 A1* | 9/2008 | Foster et al. | 713/185 |
| 2009/0089870 A1* | 4/2009 | Wahl | 726/9 |
| 2009/0119410 A1* | 5/2009 | Yang et al. | 709/231 |
| 2009/0164470 A1 | 6/2009 | Savage et al. | |
| 2009/0165055 A1* | 6/2009 | Chaudhry | 725/54 |
| 2009/0199283 A1* | 8/2009 | Jain | 726/7 |
| 2010/0175093 A1 | 7/2010 | Arnold et al. | |
| 2011/0225417 A1* | 9/2011 | Maharajh et al. | 713/150 |

OTHER PUBLICATIONS

Final Rejection dated Nov. 9, 2011 in U.S. Appl. No. 11/960,560 filed, Dec. 19, 2007 by Kapil Chaudhry.

* cited by examiner

METHOD AND SYSTEM FOR PROVIDING PROGRAM GUIDE DATA FROM A CONTENT PROVIDER TO A USER DEVICE THROUGH A PARTNER SERVICE PROVIDER BASED UPON USER ATTRIBUTES

TECHNICAL FIELD

The present disclosure relates generally to communication systems having a primary service provider, a user network device and a partner service provider, and more particularly, to a method and system for allowing program guide information for a particular user to be transferred to a user network device through a partner service provider.

BACKGROUND

The statements in this section merely provide background information related to the present disclosure and may not constitute prior art.

Communication systems such as pay communication systems include a primary service provider and a user device such as a set top box or integrated receiver decoder. The user device is typically provided with authorization to communicate with the primary service provider and receive services therefrom. One example of such a system is a satellite television system such as DIRECTV®. Conditional access is provided at the user device in the form of a card that allows the user device to receive and process signals from the primary service provider.

Allowing other service providers to interact with and provide different services that supplement the primary service, may be desirable. However, security must be maintained between the device and the partner service and the primary provider.

Further allowing access to various services even though the user is away from the user device may be desirable.

SUMMARY

The present disclosure allows program guide information for a particular user to be transferred to a user network device through a partner service provider.

In one aspect of the invention, a method includes authenticating a user network device through a partner service provider using a user identifier, generating a request for program guide data at the user network device, communicating the user identifier and the request to a partner service provider, communicating program guide data to the user network device based on the identifier data and displaying the program guide data on a display device.

In yet another aspect of the invention, a system includes a user network device associated with a user identifier, a partner service provider in communication with the user network device and a primary service provider in communication with the partner service provider authenticating the user network device provider using the user identifier. The user network device generates a request for program guide data and communicates the user identifier and the request to the partner service provider. The partner service provider or the primary service provider communicates program guide data to the user network device based on the identifier data. The user network device displays the program guide data on a display device.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
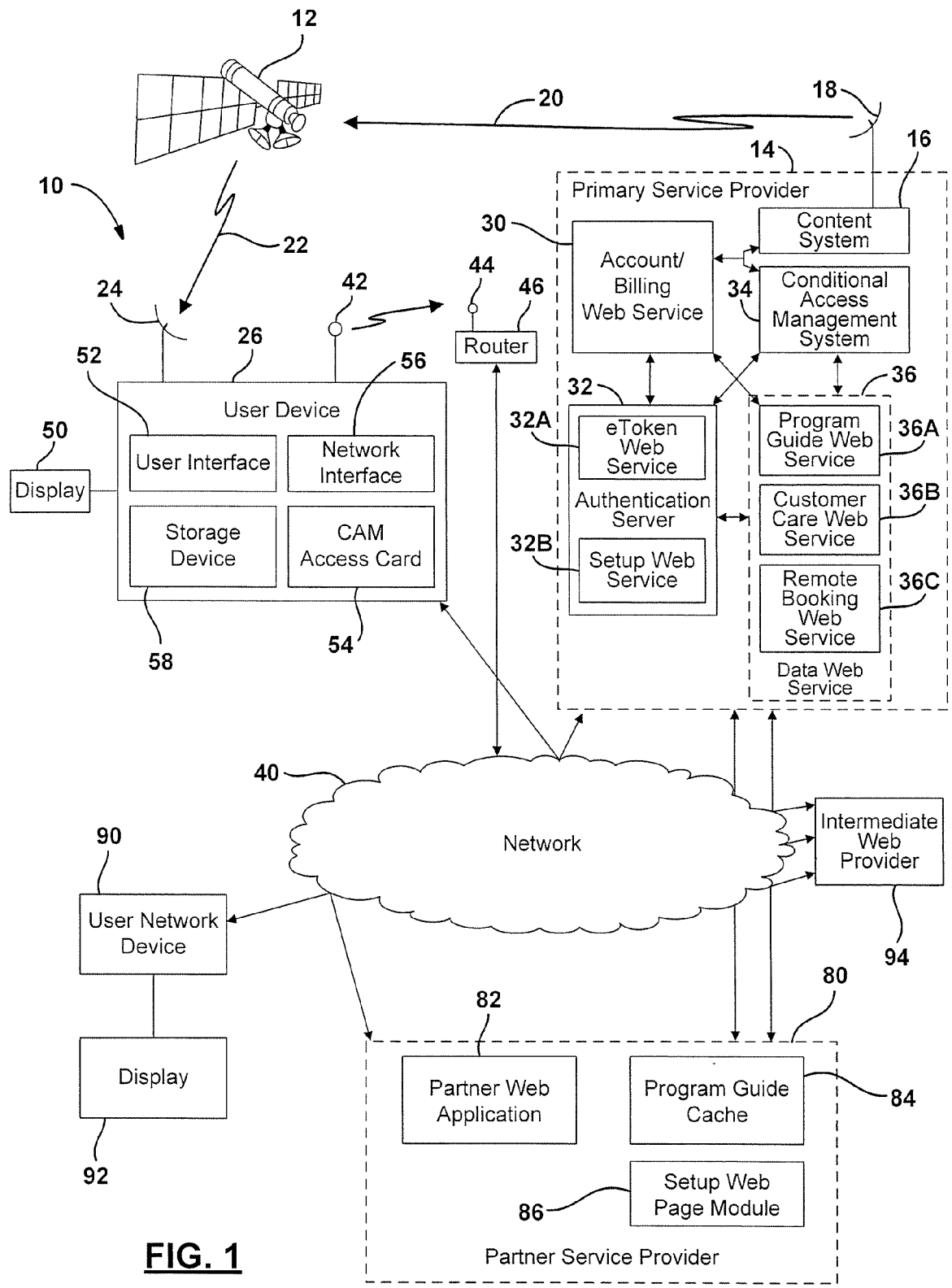
FIG. 1 is a block diagrammatic view of a satellite communication system according to the present disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Further, while the following disclosure is made with respect to the delivery of content (e.g., television (TV), movies, games, music videos, etc.), it should be understood that the systems and methods disclosed herein could also be used for delivery of any media content type, for example, audio, music, data files, web pages, games, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein. As used herein, the term title or program will be used to refer to, for example, a media content type such as a movie itself and not the name of the movie.

Referring now to FIG. 1, a satellite television broadcast system 10 is illustrated. The satellite television broadcast system 10 is illustrated by way of example. However, the present disclosure is not so limited hereto as mentioned above. The television broadcast system 10 includes a satellite 12 that receives content or programming from a primary service provider 14. More specifically, the primary service provider 14 includes a content system 16 that generates uplink signals 20 corresponding to content through an uplink antenna 18. The uplink signals 20 may be television signals and more specifically digital television signals. The uplink antenna 18 communicates the uplink signals 20 to the satellite 12 which in turn generates downlink signals 22. The downlink signals 22 are communicated to a receiving antenna 24 on a user device 26. Although only one user device 26 is illustrated, several user devices may be provided in the system 10. The uplink signals 20 and downlink signals 22 may be referred to as communication signals. Communication signals are wireless communication signals and may include various types of entertainment content, traffic, weather, hazardous material warnings, advertising material, and the like. As mentioned above, this system may be suitable for wired systems such as cable televisions and terrestrial wireless systems.

The user device 26 may include a satellite television receiver, set top box or a digital video recorder. The satellite television receiver may also be referred to as an integrated receiver decoder. Of course, other types of user devices may be used such as a cable television set top box. Other types of user devices may include a mobile device such as a lap top computer, cellular phone, personal digital assistant, a portable media player or an automotive-based television receiving device. Thus, the user device may be a fixed user device in the case of a satellite television set top box or a mobile user device. Both fixed and mobile devices may be used in a system.

The primary service provider 14 may also include an account/billing web service 30 and an authentication server 32. The authentication server 32 may include an encrypted token (eToken) web service 32A and a setup web service 32B. The eToken web service 32A may be used to generate and validate eTokens. The generation and validation process will be further described below. The setup web service 32B may be used to setup or establish information so that an eToken may be generated. The set-up process will be described further below.

The primary service provider 14 may also include a conditional access management system 34. The conditional access management system 34 may be used to grant conditional access to various programming as well as provide recording commands to the user device 26 as will be described below.

The primary service provider 14 may also include a data web service 36. The data web service 36 may include a programming guide web service 36A, a customer care web service 36B and a remote booking web service 36C.

The program guide web service 36A may be used to generate program guide data and information regarding various programming that is available. The program guide web service 36A, as will be described below, may generate custom programming guide information based upon the subscription to which a user is subscribed. The program guide web service 36A may also provide generic or non-customized content when specific user attributes are not known. When user attributes such as location and subscription information are known, only the content available to the particular subscriber may be included in the program guide. Additional content may be provided for advertising purposes. Thus, channel data for particular channels may be provided in the program guide.

The program guide web service 36A may generate program guide data for both linear and non-linear content. Linear content are television shows broadcasted at a particular time and a particular channel. Network television programming is an example. Non-linear content is programming that is not tied to a particular time such as on-demand content that can be requested at the user's discretion.

The customer care web service 36B may be used to generate and provide users with various types of help mechanisms to resolve technical issues.

The remote booking web service 36C may be used to generate remote booking commands or recording instructions as will be described below. The remote booking commands or recording instructions may be transmitted through the uplink antenna 18 to the satellite 12 and downlinked through the downlink signal 22 to an antenna 24 on the user device 26. A remote booking command may then initiate the user device 26 to store content broadcast by the satellite 12 thereon.

The user device 26 is in communication with the primary service provider 14 through a network 40. The network 40 may be a secured network or use a secure protocol. The network 40 may include a broadband network through which the user device 26 communicates with the primary service provider 14. The network 40 may be a wired network such as a public-switched telephone network (PSTN) or a broadband Internet network. The network may be wireless such as a cellular or wireless Internet system. The broadband network may communicate wired, wirelessly or a combination of both. For example, the user device 26 may include a wireless antenna 42 for communicating with an antenna 44 of a router 46 which, in turn, is in communication with the network 40.

The user device 26 may be associated with a display 50 for displaying content and programming, as well as displaying various types of user commands, or the like. The display 50 may be a television or display integrated into the device. The display 50 may include speakers for an audio display. The display 50 may be used for displaying primary content from a primary service provider and secondary content from a secondary service provider.

The user device 26 may include a user interface 52, such as a keyboard, remote control, or the like, for selecting and entering various types of information by the user. The user device 26 may also include a conditional access module 54 that allows the user to access the programming provided from the content system 16. The conditional access module 54 may be referred to as an access card. The conditional access module 54 may include various activation codes without which the user device is not activated. The conditional access module 54 may include a conditional access module identifier such as a number or a code.

The user device 26 may also include a network interface 56 for interfacing with the network 40. For example, the network interface 56 may communicate wirelessly through the antenna 42 or through a direct connection such as an Ethernet connection. The network interface 56 may be but is not limited to a wireless broadband interface, a broadband interface, a modem-type interface or a public-switched telephone network interface.

The user device 26 may also include a storage device 58. The storage device 58 may store various content received from the primary service provider therein. The content may be received through the satellite 12 or through the network 40 through the network interface 56. The storage device 58 may be a hard disk drive or memory chip-based device. The storage device 58 may be referred to as a digital video recorder.

The primary service provider 14 may be in communication with a partner service provider 80. The partner service provider 80 may include a partner web application 82, a program guide cache 84, and a setup web page module 86. The partner web application 82 may generate various types of web content. For example, the partner web application 82 may generate a homepage-type display. The homepage display may receive information from the program guide cache 84 to fill a TV listing portion of the homepage display.

The setup web page module 86 may be used to setup various types of user network devices to communicate with the partner service provider 14 as will be described below.

The system may also include a user network device 90 that includes a display 92 associated therewith. The user network device 90 may be a web browsing device such as a portable computer, a personal digital assistant, a portable video player, an automotive-based user device, or the like. The user network device 90 may receive various data from the partner service provider 80 which may include a web page. The display 92 may be used for displaying various program guide information, along with other information provided by the partner service provider. The other information may include financial information, weather information, voicemail information, or other types of information. The partner service provider 80 may provide the content to be displayed on a website in various manners together with or in addition to the program guide information or other information.

An intermediate web provider 94 may also be included in the system. The intermediate web provider 94 may be used for communication between the primary service provider 14 and the user network device 90. The intermediate web provider 94 may be used to receive content or content clips from the primary service provider and store them therein. The user device 90 may obtain the content or content clips from the intermediate web provider 94 through the network 40 as will be further described below.

The intermediate web provider 94 may also communicate with the partner service provider 80. Rather than talking or communicating directly with the intermediate web provider 94, the user network device 90 may communicate with the partner service provider 80 and then to the intermediate web provider 94. This may allow another type of service to have access to the content on the intermediate web provider 94.

Figure 2:
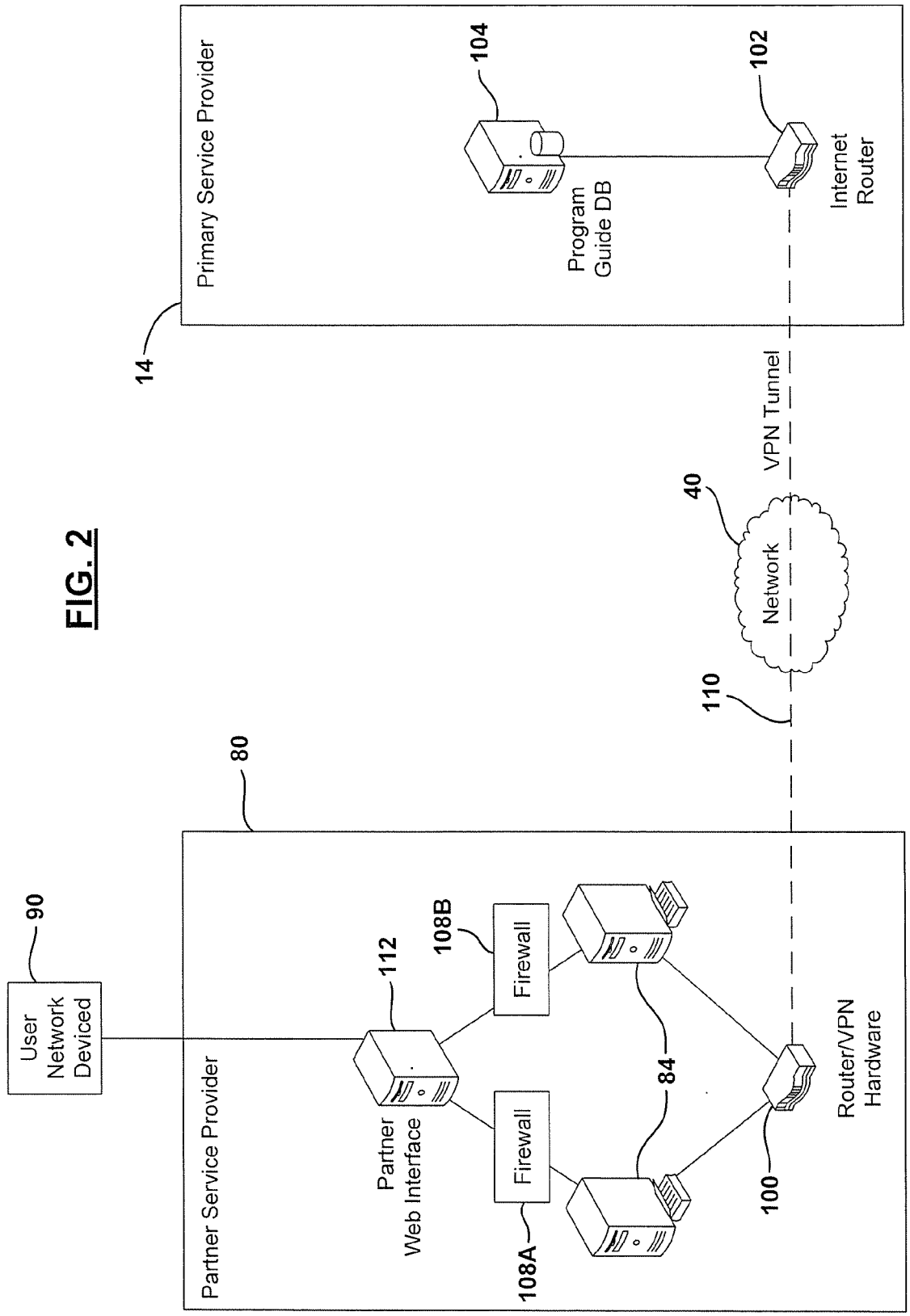
FIG. 2 is a block diagrammatic view illustrating further details of a partner service provider and the connection to a primary service provider.

Referring now to FIG. 2, a partner service provider 80 is illustrated in further detail. The partner service provider 80 may include a router or VPN hardware 100. The router 100 may communicate with a router 102 at the primary service provider 14. The program guide web service 36A of FIG. 1 may include a program guide database 104.

The partner service provider 80 may include the program guide cache 84 as set forth above. The cache 84 is illustrated in FIG. 2 as two devices. The program guide web service 36A described in FIG. 1 as being within the primary service provider 14, may also be provided within the partner service provider 80. The program guide web service and cache 84 may communicate with the user network device 90 through respective firewalls 108A and 108B.

The program guide data may be communicated from the program guide database 104 through the router 102 to the router 100 and stored within the program guide web service and cache 84. A virtual private network tunnel 110 may be established between the router 100 and router 102 for transferring the data therethrough. By providing the program web service and cache 84 at the partner service provider 80, delays due to network connections may be reduced since the user network device 90 will not have to wait for program guide data to be transferred through the network between the primary service provider 14 and the partner service provider 80.

The program guide web service and cache 84 may each be in parallel with a firewall 108A and 108B. The output of the program web service and cache 84 may be provided to the partner web interface 112. The partner web interface 112 may be used to direct program guide data to the user network device 90.

Figure 3:
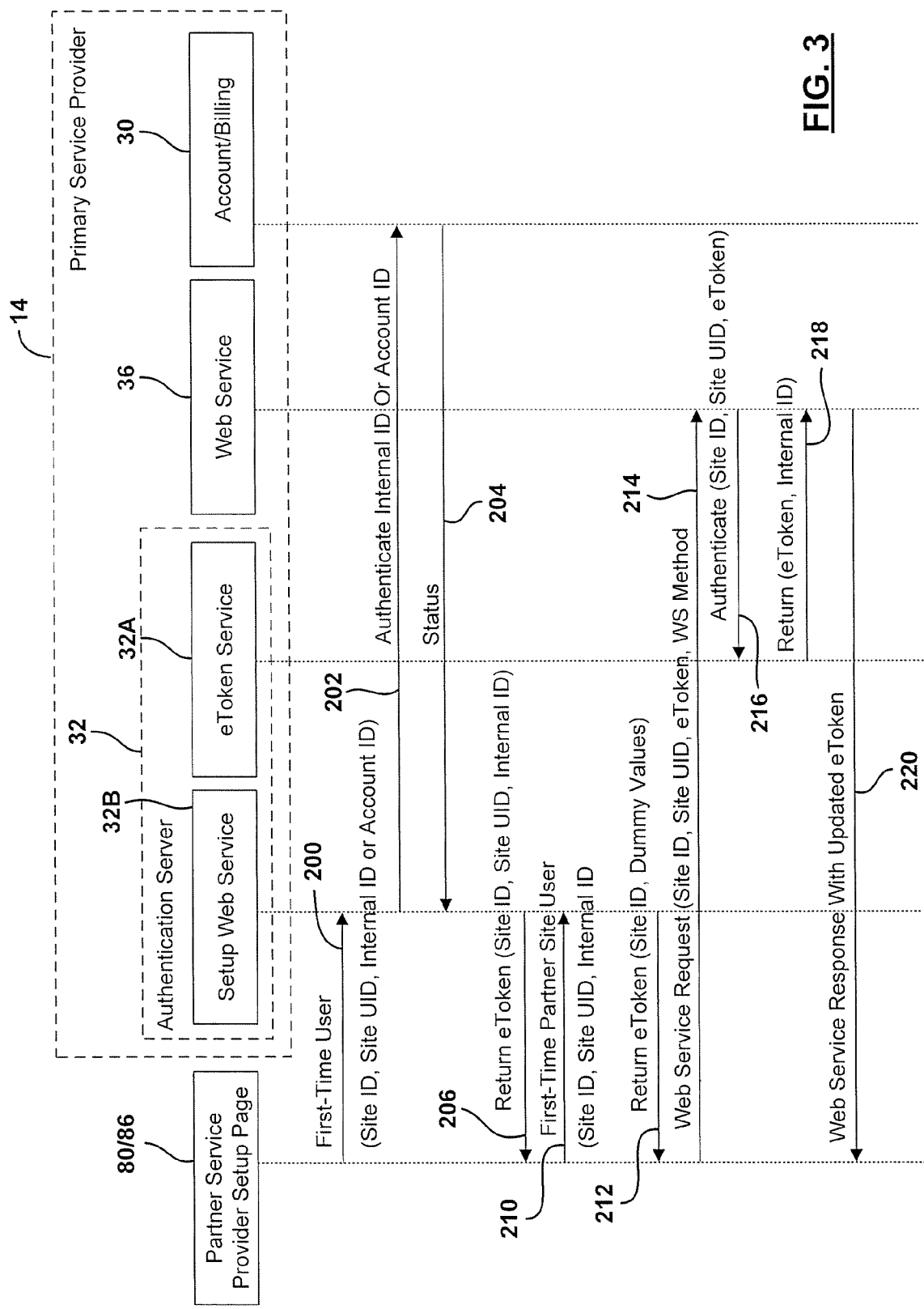
FIG. 3 is a flow diagram of a process for authentication between a partner service and a primary service provider.

Referring now to FIG. 3, a flow diagram having the setup page module 86, the authentication server 32 having the setup service 32B and the eToken service 32A, the data web service 36, and the account/billing web service 30 is illustrated. In step 200, a first-time user of the partner service web application may provide various identifying data to an account setup page. Thus, an account setup page may be initiated for a first-time user. Initiation of the setup page may also take place if the user requests data or requests an encrypted token from the data web service 36 for the first time. Identifiers prompted for entry at the setup page may include a site identifier which is the identifier of the partner service provider, a site user ID which is the partner's user ID. For example, the site ID may be the login identifier of the particular customer for the partner service provider. An internal identifier may also be provided, such as an account number that corresponds to the primary service provider account of the user. Other identifying information may include the customer's first name, last name, phone number and last bill amount provided by the primary service provider. The information mentioned above may be provided at a setup web page that identifies the user as a new user. The user network device 90 of FIG. 1 may be used to enter the information corresponding to the user. The site identifier may be provided by the particular partner service provider. The site identifier may be predetermined through an established arrangement with the primary service provider.

In step 200, after the user enters the various information into the setup web page, the information is communicated from the partner service provider, and, in particular, the setup web page to the setup web service 32B. The information may be communicated through the network 40 of FIG. 1.

In step 202, the account/billing web service 30 may receive the information at the primary service provider 14 through the network 40. The various information such as the internal identifier or account identifier may be provided to the account/billing service 30. The process may be first started by validating or authenticating the site identifier provided by the partner service provider. Thereafter, the internal account or ID may be authenticated.

In step 204, once the site identifier and the internal or account identifier are authenticated, a status signal is communicated to the setup web service 32B. The status may include a non-authenticated status.

If the status is positive, meaning the authentication has taken place, an encrypted token or eToken may be generated at the setup web service 32B in step 206. The eToken may be formed using various combinations of identifiers but may include a site identifier, a site user identifier, and a DIRECTV® internal identifier or account identifier. The eToken may also have an expiration date and/or time specified therein. The expiration date may have a current date time in which the eToken was formed and an elapsed time through which the eToken is valid. The elapsed time may be in seconds that are counted from the current time when the eToken is formed. Thus, the lifespan of the eToken is set forth. In subsequent authentication requests, if the expiration time is still valid, authentication may not be necessary. The eToken may be returned without modification if the eToken is still valid. If the expiration time has expired, re-authentication may be required and a new token may be generated with an updated expiration date and time.

In step 210, the partner service provider may also be used to obtain various data from the data web service 36 of the primary service provider 14. The partner service provider will thus not have individual customer or user information associated therewith. Therefore, the site identifier may be provided and dummy values or no values at all for the specific user information described above may be communicated to the setup web service 32B. If the site ID is a valid site ID as determined in the setup web service 32B, an eToken is generated using the site ID and dummy values if needed in step 212.

After the eTokens have been returned in steps 206 and 212, the web service or web application 82 in FIG. 1 of the partner service provider 80 may generate a web service request. The web service request may initiate from the user using the website from the partner service provider 80. The web service request may be a request for data. In addition, a web service request may initiate from the partner service provider itself so that various information may be received, such as program guide data. In step 214, the web service request is provided and may include the eToken, a site identifier, a site user identifier and a web service method. The web service request may be provided from the partner service provider and may be communicated to the data web service 36 of the primary service provider 14. Communication of the web service request may take place through the network 40.

In step 216, the information such as the site ID, the site user ID and the eToken may be communicated to the eToken web service 32A at the primary service provider 14. Authentication may decrypt the eToken and ensure that the site ID and the site user ID correspond with the site ID and the site user ID of the eToken. Authentication will be further described below. In step 218, the eToken and internal or account identifier may be returned once the authentication takes place in step 216. The return signal may return back to the web service 36. The web service 36 may then generate a web service response in step 220. The web service response may include an updated eToken if the eToken was expired and data from the web service 36.

Figure 4:
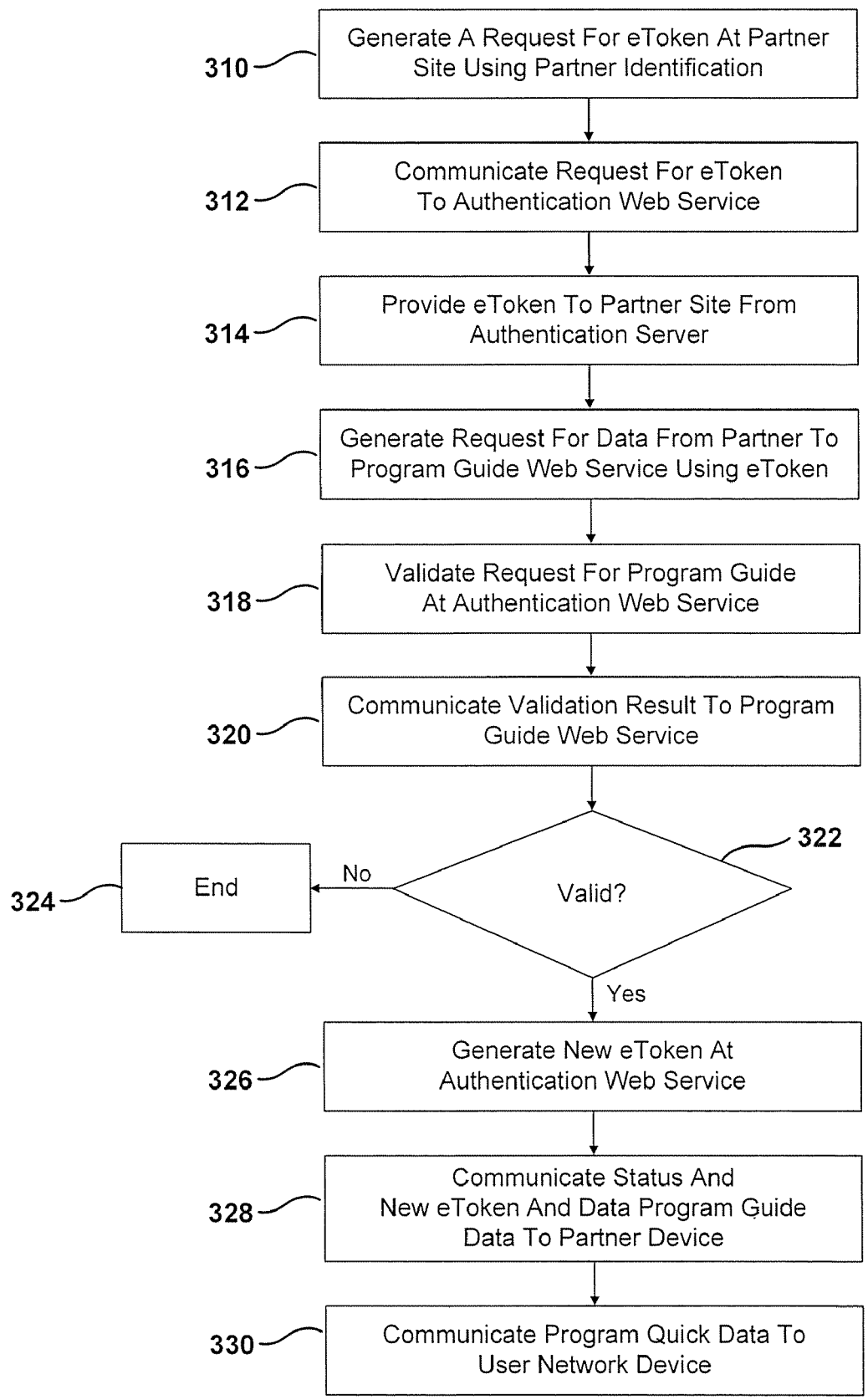
FIG. 4 is a flowchart of a method for establishing communication between a partner service provider and a primary service provider and requesting program guide data.

Referring now to FIG. 4, a method for establishing communication between a partner service provider and the primary service provider and requesting program guide data is set forth in more detail. The method also applies to non-program guide data requests as well. In step 310, a request for an eToken is generated at a partner site using partner identification such as the site identifier. Dummy values may also be used to replace expected variables corresponding to other types of formats and devices. In step 312, the request for an eToken is communicated to the authentication web service. In step 314, the eToken is generated and provided to the partner site from the authentication server. The generating and communicating of the eToken is performed in response to authenticating or validating the site ID or any other identifiers provided. In step 316, a request or data from the partner to the program guide web service is performed using the eToken. In step 318, the request for program guide data is validated at the authentication web service. In step 320, the validation results are provided to the program guide web service. In step 322, if the results indicate the request is not valid, then step 322 ends the process. If a valid request was generated in step 322, step 326 generates a new eToken at the authentication web service. The revising of the eToken may be an optional step and may be performed when an eToken has expired. However, a new eToken could be generated at each request.

In step 328, the status, the new eToken and the program guide data may be communicated to the partner device. In step 330, the various data as received from the data web service of the primary service provider may be communicated to the user network device.

Figure 5:
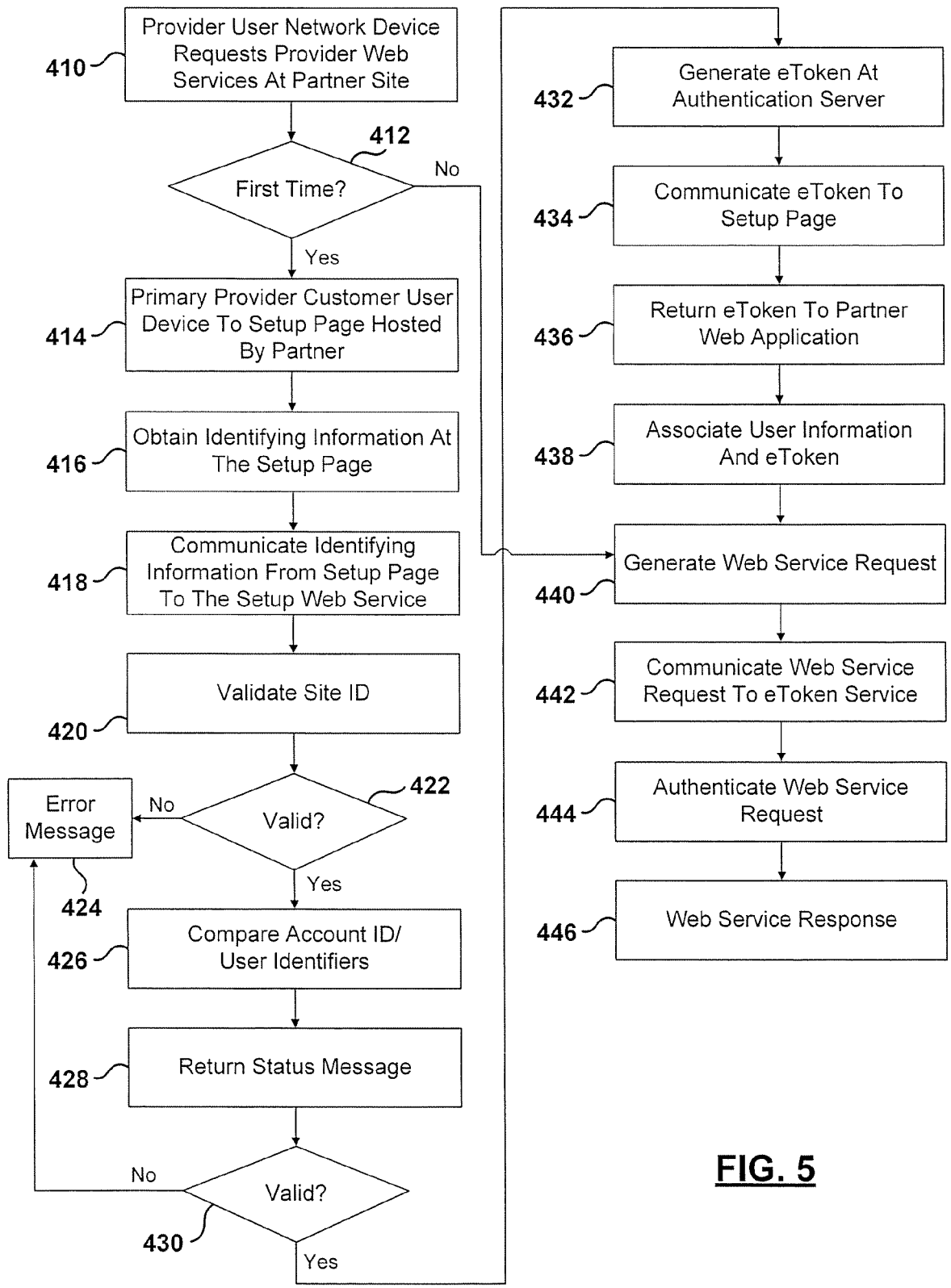
FIG. 5 is a flowchart of a method for configuring a user to communicate to the partner service provider and the primary service provider.

Referring now to FIG. 5, a method of configuring a user to communicate to the partner service provider and the primary service provider 14 is illustrated. In step 412, if the user is a first-time user, step 414 is performed. In step 414, the primary provider customer is directed to the setup page hosted by the partner. That is, the user device has setup information provided thereto. In step 416, information identifying the user is provided through the network user device. As mentioned above, this may include the name, address, telephone number, account or other type of identifier, or the like. In step 418, identifying information is provided from the setup page to the setup web service. That is, the information is communicated from the partner service provider to the primary service provider. In step 420, the site identifier is validated. In step 422, if the site identifier of the partner service provider is not valid, step 424 generates an error message. If the site is valid, step 426 compares the account ID and the user identifiers. In step 428, a status message is returned in response to the comparison performed in step 426. In step 430, if the information is not valid, an error message is generated in step 424. In step 430, if the user information is valid, step 432 generates an eToken at the authentication server 32 of the primary service device 14 of FIG. 1. In step 434, the eToken is communicated to the partner service provider 80. More specifically, the eToken may be provided to the setup page module 86.

In step 436, the partner web application and/or the setup web page module may receive the eToken. In step 438, the user information and the eToken are associated together. Thus, the user may only have to perform the setup web page service one time. Step 440 may be performed if step 412 indicates that the user has registered before. Also, step 440 is performed after step 438. In step 440, the web service request from the user network device 90 of FIG. 1 is generated. In step 442, the web service's request is communicated to the eToken web service 32A in the primary service provider 14 from the partner service provider 80. In step 444, the request is authenticated. In step 446, the web service responds by generating various data and communicating the data from the primary service provider 14 to the partner service provider 80 and ultimately to the user network device 90.

Figure 6:
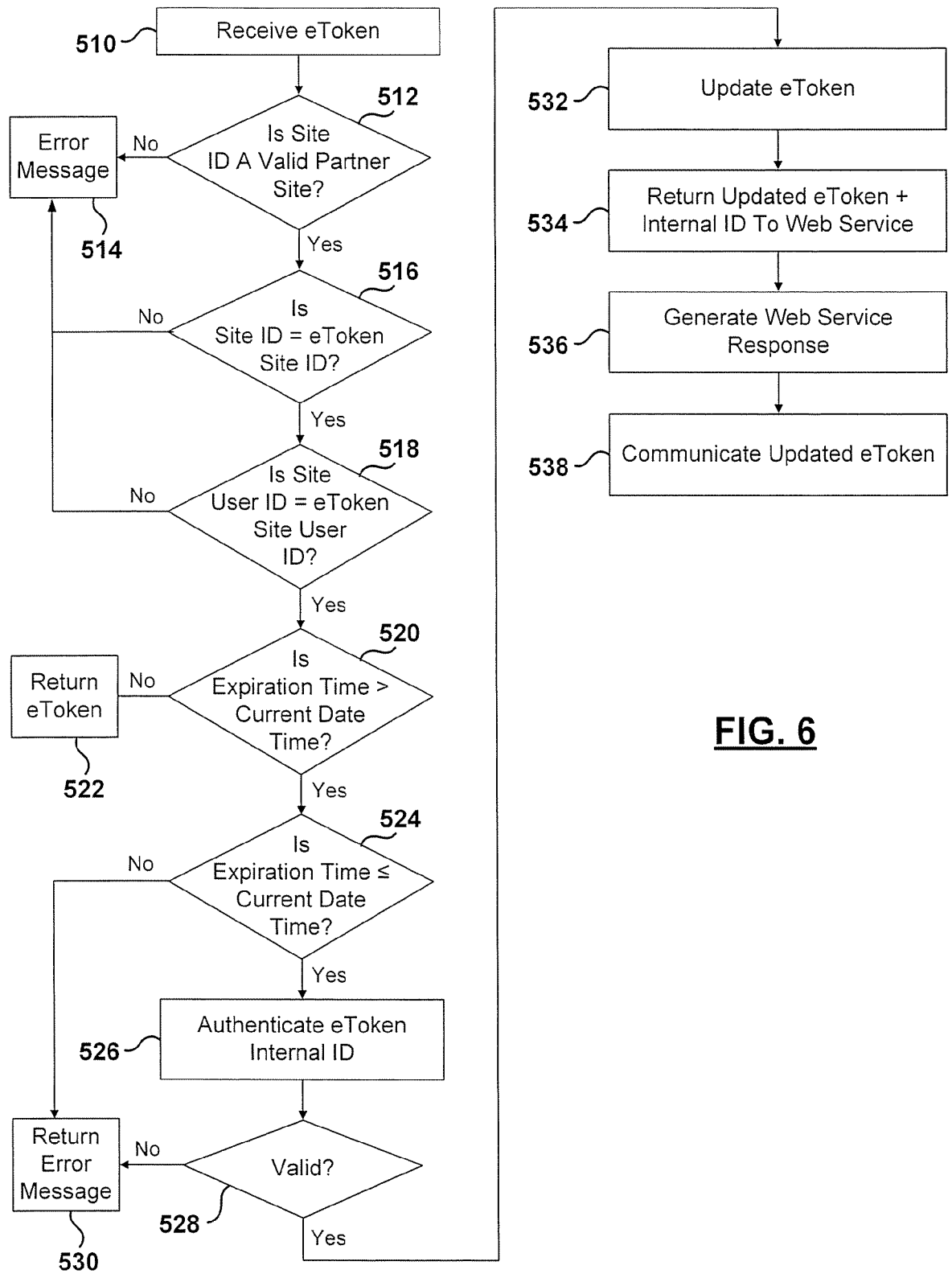
FIG. 6 is a flowchart of the authentication process described in FIG. 5.

Referring now to FIG. 6, the authentication process described briefly in step 444 of FIG. 5 is set forth in more detail. In step 510, an eToken is received at the eToken web service 32A. Ultimately, the eToken arrives from the partner service provider 80 through the network 40. The eToken may arrive through one of the data web services 36. In step 512, if the site ID of the partner service provider is not a valid partner site identifier, step 514 generates an error signal. In step 512, if the partner site is a valid partner site, step 516 is performed. The site ID is then compared to the site ID that was encrypted into the eToken. That is, the eToken is decrypted to determine the site ID formed therein. If the site ID is not equal to the site ID retrieved from the eToken, step 514 is again performed. If the site ID is equal to the site ID from the eToken, step 518 is performed. In step 518, the site user ID is compared to the site user ID from the decrypted eToken. If the site ID is not equal to the site ID it retrieved from the eToken, step 514 generates an error signal. In step 518, if the site ID is equal to the eToken site user ID, step 520 is performed. In step 520, if the expiration time is greater than the current time, the eToken is returned in step 522.

In step 520, if the expiration time is greater than the current date and time, step 524 is performed. In step 524, if the expiration time is less than or equal to the current date and time, step 526 is performed. Step 526 authenticates the eToken internal identifier. If the eToken internal identifier is not valid in step 528, an error message is returned in step 530.

If the eToken internal ID is valid, step 532 updates the eToken expiration time. In step 534, the updated eToken is returned and the internal ID is communicated to the web service. In step 536, a web service response is generated.

In step 538, the updated eToken is communicated to the partner service provider 80.

Figure 7:
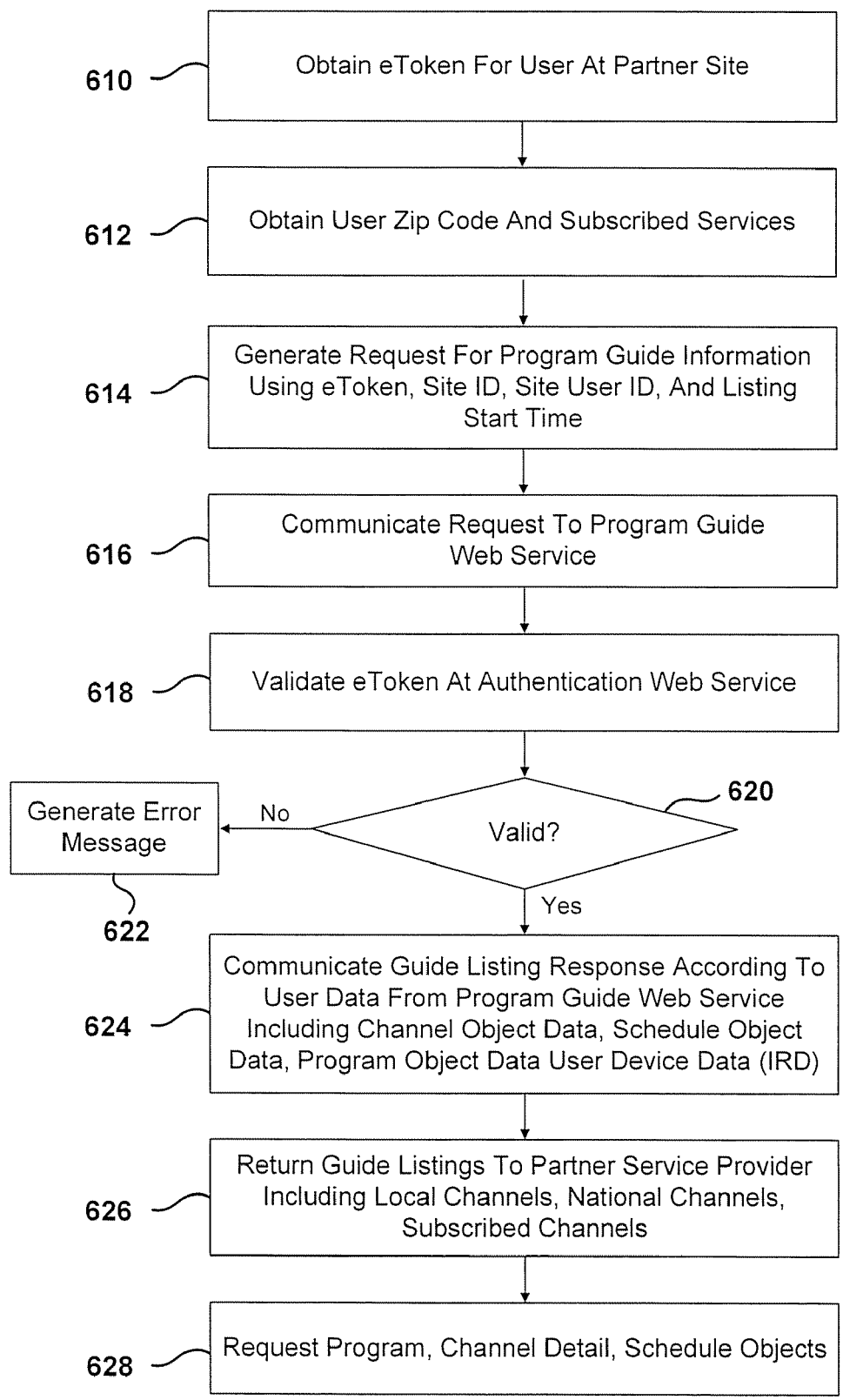
FIG. 7 is a method for requesting a linear program guide.

Referring now to FIG. 7, a method for requesting a linear program guide is performed. In step 610, an eToken for the user is obtained through the partner site. In step 612, additional data such as the zip code and subscribed services may also be retrieved. The additional data may be retrieved using the setup web page module 86. In step 614, a request for the programming guide using the eToken, the site identifier, the site user identifier and the site listing start time may be generated at the partner service provider. In step 616, the request and associated data may be communicated to the program guide web service 36A. In step 618, the eToken may then be communicated to the authentication server 32 where it is authenticated. If the eToken is not valid, an error message is generated in step 622. In step 620, if the eToken is valid, step 624 communicates a guide listing response according to the user from the programming guide web service. That is, specific subscription data may be obtained from the account billing web service 30 to inform the program guide web service 36 as to the subscriptions and location of the user network device. The program guide in step 624 may return channel object data, schedule object data, program object data and user device data which corresponds to information regarding the integrated receiver decoder or set top box. The data may be used to provide a program guide to the user network device 90.

The channel object data may include the primary visible content channels valid between the listing start date and the end date. The channel data may include channels provided by the primary service provider as well as turnaround channels provided by the primary service provider. The channel object may comprise various information such as a channel key which is a unique key made up of the content channel identifier and the channel start time that identifies the channel instance. The content channel identifier specifies the identifier for the content channel. The channel start time and channel end time specify the starting and ending time that the channel is valid. Certain channels may be valid indefinitely and some channels may be valid only for a predetermined amount of time. The channel object may also include a channel object identifier. This specifies the content key in the provider system that maps to the content channel identifier. A major channel number and minor channel number may also be used as an identifier. A market identifier corresponding to a designated marketing area corresponding to the Nielsen® geographic data may also be set forth. National broadcast channels may not specify a market identifier. A source identifier may also be provided for the channel. For example, various sources for the channel identifier may be provided including Tribune Media Services. The station ID may also be provided in the channel object. A short name and long name corresponding to the call letters or the channel may be provided. A description, category, service type, codec type, network affiliation, channel logo ID and authorization code may also be provided. The authorization code may correspond to fully subscribed, partially subscribed, not subscribed or not applicable. The authorization code may allow users to view information if the information has been subscribed to.

Schedule data may also be provided which includes the air time for a particular program, the duration that includes the length of time that the program will air, an authorization code similar to those described above including subscribed, not subscribed and not applicable, and a blackout code to determine if the content may be blacked out.

Program data may also be provided. Program data may use a program reference identifier that is used to uniquely identify the program record and its contents. The program title, the episode title or the sports team's name may also be provided. A theatrical release year, original air date, a description describing the program content may also be provided. A secondary identifier such as a tribune media services identifier may also be provided in the program data. A category, label such as a category or genre may also be provided. The relevance of the category label may also be categorized. An in-guide flag may also be provided which indicates whether or not the label should appear with the program description on the screen. A credit, contribution, last name, first name, source type and network/syndicater-type may also be provided. Indicators may also be provided as to whether the program is in color, provides a secondary audio program, whether the program is a repeat, a premiere or a finale and whether the program is live, taped or taped delay. Other information may include whether the content is subtitled, letterboxed and the ratings of the particular content. An advisory may also be provided in the program data. An advisory may correspond to motion picture advisories. A television advisory may also be provided for television content that includes TVY7, TVPG, TV14, TVMA. A close-captioning indicator, a high definition indicator, an AC3 audio content indicator, a Dolby surround sound indicator, pay-per-view data, an all-day ticket data or a descriptive video service data may also be provided.

IRD data or set top box data may also be returned to the partner service provider. This information may be used to schedule a recording from the user network device. The partner service provider may use the IRD or user device information to target specific IRDs corresponding to the subscriber's account. The IRD or user device information may include a receiver ID that identifies the partner service receivers. The access card identifier may also be provided. The model number of the user device, the manufacturer of the user device and the location within the customer's premises may also be provided. The various numbers of receiving devices or user devices may be provided with a customer account. Therefore, a specific user device may be specified. The receiving device data may also include a remote booking allowed flag. This flag may indicate whether or not remote booking is allowed.

In step 626, the guide listings are returned that include the local channels, national channels and subscribed channels and the various data described above. In step 628, a program may be requested using the channel detail, the program detail and the user device data.

Figure 8:
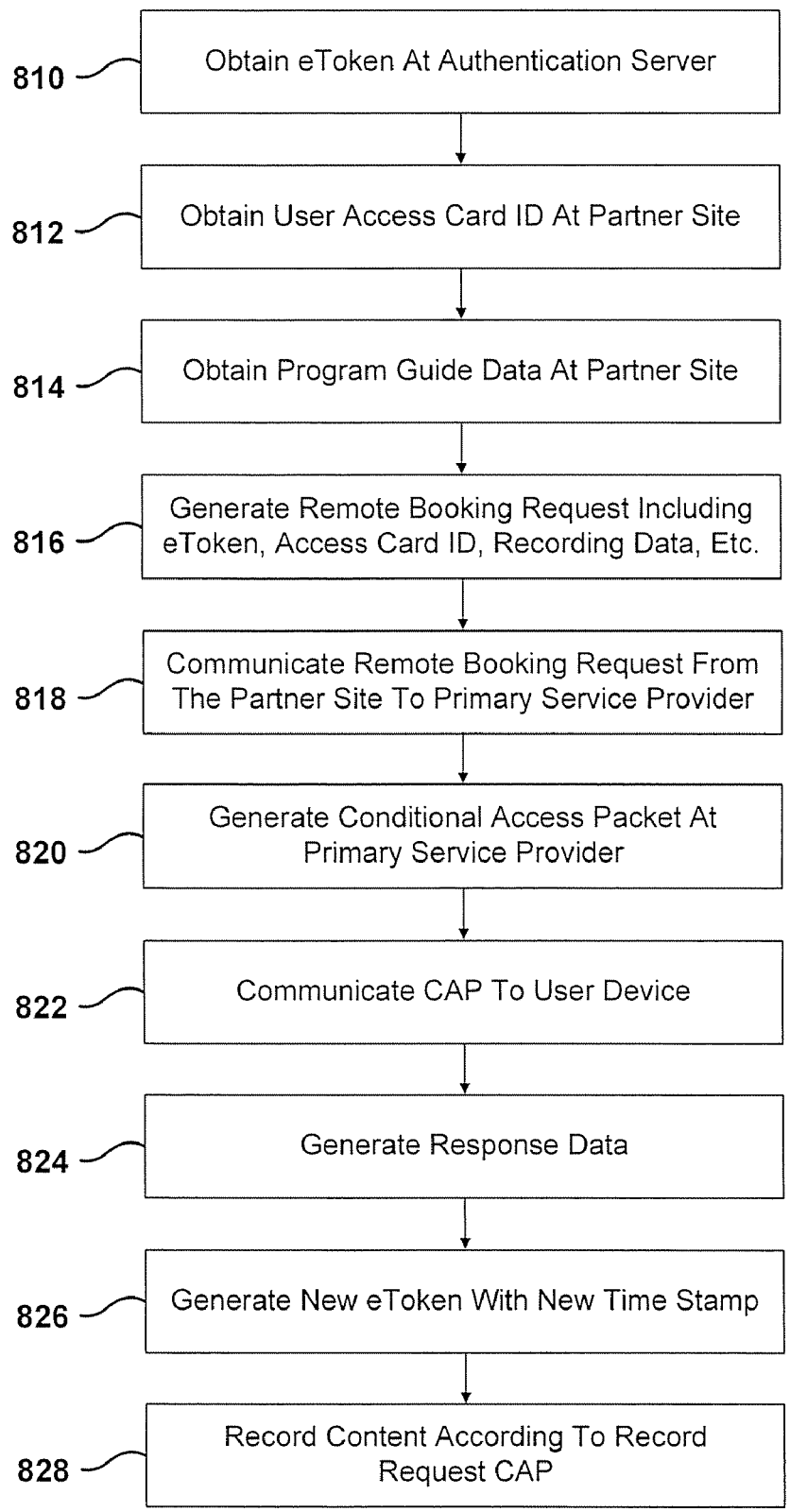
FIG. 8 is a flowchart of a method for remote booking from a user device.

Referring now to FIG. 8, a detailed method for remote booking is set forth. Remote booking is used to allow the user network device to request the storage device of the user device to store a broadcast program or content. In step 810, an eToken is received at the partner site from the primary service provider, and, more particularly, eToken web service 32A of FIG. 1. In step 812, the user access card ID is obtained at the partner site. This may be obtained when a request for program guide data or other data is provided as mentioned above. In step 814, the program guide data is also received at the partner site. As mentioned above, various types of channel data, object data, program data and receiver device data may be obtained. In step 816, remote booking requests, including eToken, access card identifier and recording data may be generated. In step 818, the remote booking request may be communicated from the partner site to the primary provider. In step 820, a conditional access packet may be generated at the primary service provider.

In step 822, the conditional access packet may be communicated to the user device. The conditional access packet may be a recording instruction for a particular program at a particular time on a particular channel. In step 824, a response data may be generated from the primary service provider to the partner service provider. The response data may include a successful transmission of a conditional access packet to indicate that the user device may record the information within the storage device 58. After step 824, a new eToken with a new timestamp may be provided from the primary service provider and, in particular, the eToken web service 32A with a new timestamp. As mentioned above, a new timestamp may be provided if the previous timestamp has expired.

In step 828, the content may be recorded according to the recording request or conditional access packet as described above. The content is then able to be used and/or played back at the convenience of the user of the user device.

Figure 9:
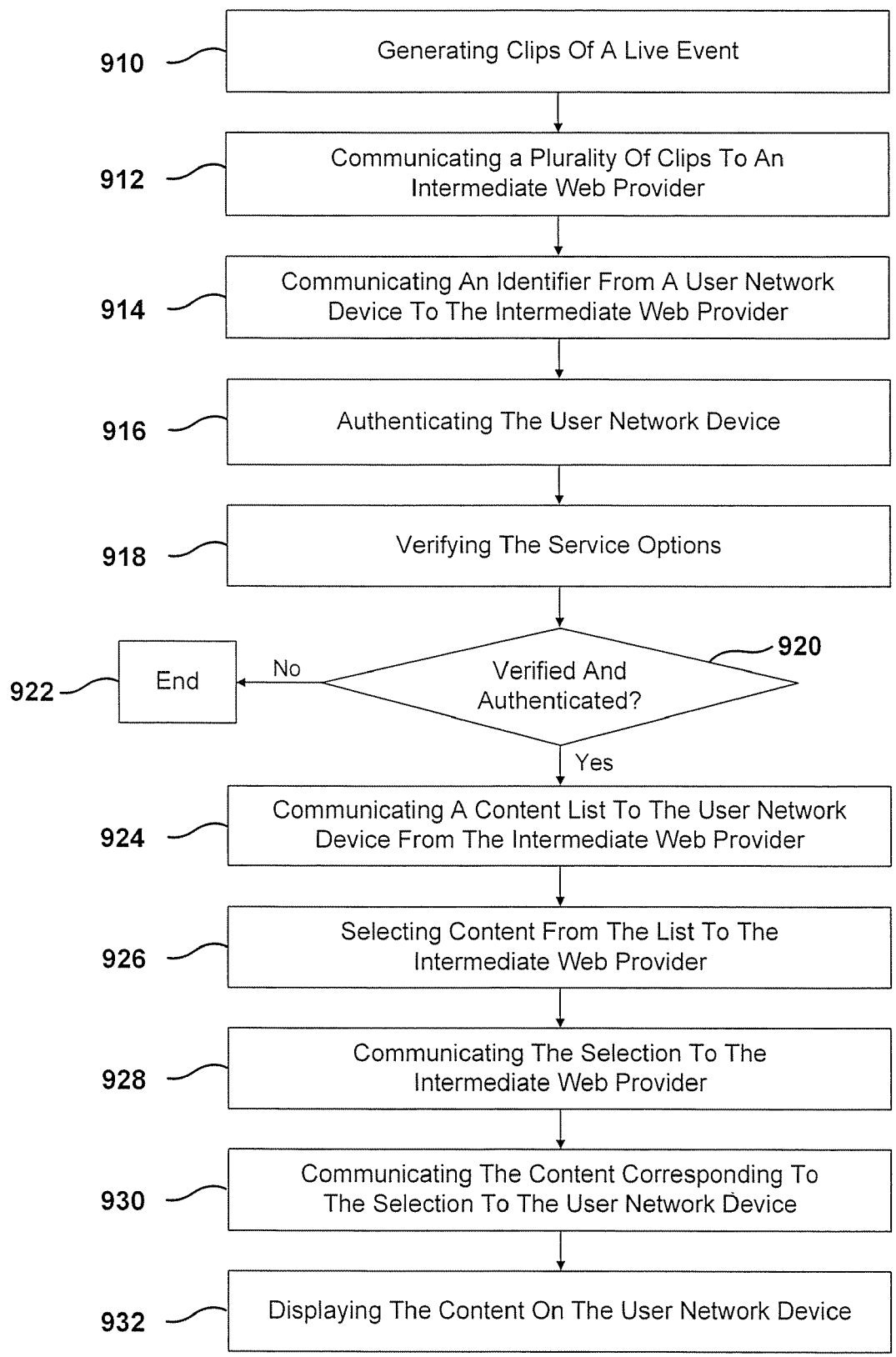
FIG. 9 is a flowchart of a method for providing content to a user network device.

Referring now to FIG. 9, a method for reviewing content such as recorded clips of live events is set forth. In this example, the clips may be recorded or saved from a live event such as a football game or other event. The clips may be highlights of important events and thus may be only a small portion of a particular event. In step 910, clips of a live event are generated. The live event clips may be generated in the primary service provider or may be generated elsewhere and communicated to the primary service provider.

In step 912, a plurality of clips is communicated to an intermediate web provider. The clips may be provided to the intermediate web provider in response to a query from the intermediate web provider if more current clips are available. The clips may also automatically be provided to the intermediate web provider.

In step 914, an identifier from a user network device is communicated to the intermediate web provider. The user network device may communicate various identifier-type information including an account number or other type of login and/or password. In step 916, the user device is authenticated. The user device may be authenticated at the intermediate web provider, or the identifier data may be communicated to the primary service provider. In step 916, the network device is authenticated. In step 918, the service options to receive the content may be determined. For football clips, for example, the user may be required to subscribe to a Sunday football package. Both the authenticating and the verifying may take place either at the intermediate web provider or at the primary service provider. Both the authentication and verification may take place at the same time.

In step 920, if the user network device is not verified or authenticated, step 922 ends the process. In step 920, if the user network device has been verified and authenticated, step 924 communicates a content list to the user network device from the intermediate web provider. The content list may include a list of a number of the most recent NFL clips, in carrying forward with the example set forth above. For example, a list of five may be provided.

In step 926, content may be selected from the list to form a selection at the user network device. In step 928, the selection is communicated to the intermediate web provider. In step 930, the content corresponding to the selection is communicated to the user network device.

In step 932, the content may be displayed on the user network device. That is, the content video may be played back through the user network device. As mentioned above, the user network device may be various types of devices, including a mobile phone or other type of web-enabled device. It should be noted that the content list in FIG. 9 may be continually updated and thus the content list may be continually provided to the user network devices.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:
1. A method comprising:
authenticating a user network device through a partner service provider using a user identifier by communicating the user identifier to a primary service provider from the partner service provider, generating an encrypted token at the primary service provider and communicating the encrypted token to the user network device through the partner service provider;
generating a request for program guide data at the user network device that includes the encrypted token;
communicating the user identifier, the request and the encrypted token to the partner service provider;
communicating program guide data to the user network device in response to the user identifier, the request and the encrypted token; and
displaying the program guide data on a display device.

2. A method as recited in claim 1 wherein authenticating comprises authenticating the user network device at an authentication web service of the primary service provider.

3. A method as recited in claim 1 wherein authenticating comprises authenticating the user network device through the partner service provider using a partner service provider identifier.

4. A method as recited in claim 1 wherein the primary service provider generates the encrypted token from the user identifier and a partner service provider identifier and wherein communicating the user identifier and the request to the partner service provider comprises communicating the user identifier, the request and the encrypted token to the partner service provider.

5. A method as recited in claim 1 wherein the primary service provider generates the encrypted token from the user identifier, a partner service provider identifier and an expiration time and wherein communicating the user identifier and the request to the partner service provider comprises communicating the user identifier, the request and the encrypted token to the partner service provider.

6. A method as recited in claim 1 wherein authenticating the user network device comprises:
   initiating an account set-up page from the partner service provider;
   providing primary service account data from the user network device in response to the account set-up page;
   communicating the primary service account data to a primary service provider set-up web service; and
   validating the primary service account data at the primary service provider set-up web service.

7. A method as recited in claim 1 further comprising determining account attributes at the primary service provider.

8. A method as recited in claim 7 wherein determining account attributes comprises determining subscribed services from the identifier.

9. A method as recited in claim 7 wherein determining account attributes comprises determining a user location.

10. A method as recited in claim 1 wherein communicating the user identifier and the request to the partner service provider comprises communicating the user identifier and the request to a program guide web service through the partner service provider.

11. A method as recited in claim 1 wherein communicating program guide data to the user network device comprises communicating program guide data from a program guide web service to the user network device.

12. A method as recited in claim 1 wherein communicating program guide data to the user network device comprises communicating program guide data from the partner service provider to the user network device.

13. A method as recited in claim 12 further comprising communicating program guide data from a program guide web service through a virtual private network to the partner service provider prior to communicating program guide data from the partner service provider to the user network device.

14. A method as recited in claim 1 wherein communicating program guide data comprises communicating a channel object.

15. A method as recited in claim 14 wherein communicating a channel object comprises communicating a content identifier.

16. A method as recited in claim 1 wherein communicating program guide data comprises communicating a schedule object.

17. A method as recited in claim 16 wherein communicating a schedule object comprises communicating a schedule time.

18. A method as recited in claim 1 wherein communicating program guide data comprises communicating a schedule object within a channel object.

19. A method as recited in claim 1 wherein communicating program guide data comprises communicating a program object.

20. A method as recited in claim 19 wherein communicating a program object comprises communicating a program title.

21. A method as recited in claim 1 wherein communicating program guide data comprises communicating a program object within a channel object.

22. A method as recited in claim 1 wherein communicating program guide data comprises communicating a program object and a schedule object within a channel object.

23. A method as recited in claim 1 wherein communicating program guide data comprises communicating non-linear guide data.

24. A method as recited in claim 1 wherein communicating program guide data comprises communicating linear guide data.

25. A method as recited in claim 1 wherein communicating program guide data comprises communicating linear guide data and non-linear guide data.

26. A system comprising:
   a user network device associated with a user identifier;
   a partner service provider in communication with the user network device receiving the user identifier;
   a primary service provider in communication with the partner service provider authenticating the user network device using the user identifier and generating an encrypted token in response to the user identifier and communicating the encrypted token to the user network device through the partner service provider,
   said user network device generating a request for program guide data and communicating the user identifier, the request and the encrypted token to the partner service provider,
   said partner service provider or said primary service provider communicating program guide data to the user network device based on the user identifier and the encrypted token; and
   said user network device displaying the program guide data on a display device.

27. A system as recited in claim 26 wherein the primary service provider authenticates the user network device using the user identifier and a partner service provider identifier.

28. A system as recited in claim 27 wherein the primary service provider generates the encrypted token from the user identifier and the partner service provider identifier.

29. A system as recited in claim 27 wherein the primary service provider generates the encrypted token from the the user identifier, the partner service provider identifier and an expiration time and wherein communicating the user identifier and the request to the partner service provider comprises communicating the user identifier, the request and the encrypted token to the partner service provider.

30. A system as recited in claim 27 wherein said primary service provider determines account attributes of a user account.

31. A system as recited in claim 30 wherein the account attributes comprise subscribed services.

32. A system as recited in claim 30 wherein the account attributes comprise a user location.

33. A system as recited in claim 26 further comprising a virtual private network between the primary service provider and the partner service provider; said virtual private network communicating program guide data from the partner service provider to the user network device.

34. A system as recited in claim 26 wherein the program guide data comprises a channel object.

35. A system as recited in claim 34 wherein the channel object comprises a content identifier.

36. A system as recited in claim 26 wherein the program guide data comprises a schedule object.

37. A system as recited in claim 36 wherein the schedule object comprises a schedule time.

38. A system as recited in claim 26 wherein the program guide data comprises a schedule object within a channel object.

39. A system as recited in claim 26 wherein the program guide data comprises a program object.

40. A system as recited in claim 39 wherein the program object comprises a program title.

41. A system as recited in claim 26 wherein the program guide data comprises a program object within a channel object.

42. A system as recited in claim 26 wherein the program guide data comprises a program object and a schedule object within a channel object.

43. A system as recited in claim 26 wherein the program guide data comprises non-linear guide data.

44. A system as recited in claim 26 wherein the program guide data comprises a linear guide data.

45. A system as recited in claim 26 wherein the program guide data comprises linear guide data and non-linear guide data.

* * * * *